United States Patent Office 3,385,816
Patented May 28, 1968

3,385,816
POLYETHER LEVELING AGENTS FOR
POLYURETHANE COATINGS
Arthur W. Sawyer and Trescott B. Larchar, Sr., Hamden,
Conn., assignors to Olin Mathieson Chemical Corporation, a corporation of Virginia
No Drawing. Filed Oct. 23, 1965, Ser. No. 504,204
15 Claims. (Cl. 260—33.2)

ABSTRACT OF THE DISCLOSURE

Glycol diethers and certain polyether formals are added in a small but effective proportion to a urethane resin solution of an isocyanate-terminated polyether polyol in a hydrocarbon solvent in order to lower viscosity of the urethane resin solution and act as a leveling agent for the resulting urethane coating, which is substantially clear and free of indentations.

---

This invention relates to novel additives to reduce the viscosity of urethane resin solutions and to improve the leveling characteristics of these compositions when cured to rigid urethane coatings.

Numerous urethane coating systems are available at the present time which contain isocyanate-terminated reaction products of polyether polyols and organic isocyanates which cure to form rigid urethane coatings. For example, a polyether polyol such as oxypropylated glycerin is reacted with an organic isocyanate such as toluene diisocyanate, the proportion of NCO groups in the isocyanate added being in excess of the OH groups in the oxypropylated glycerin, to yield an isocyanate-terminated reaction product. A solution of this reaction product is prepared by carrying out the reaction in the presence of a suitable solvent for the reaction product, or by admixing the reaction product with a suitable solvent. To this solution is added other substances such as cellulose acetate butyrate, which acts as a leveling agent, and other substances such as pigments, fillers, and the like may also be added if desired.

The term "urethane resin solution," as used throughout the decription and claims, is intended to include solutions of isocyanate-terminated reaction products dissolved in a hydrocarbon solvent, with or without a leveling agent or other substances, which solution are curable to rigid urethane coatings.

When a urethane resin solution of this type is applied to a substrate by any conventional technique such as brushing, spraying or the like, the solvent evaporates into the atmosphere leaving the isocyanate-terminated reaction product which reacts with moisture in the air to form a urethane polymer. The resulting urethane polymer is a rigid coating which generally resists attack by heat and chemicals. When ethylene glycol monoethyl ether ester is employed as a solvent in coating systems of this type, a cellulose acetate butyrate resin can be an effective leveling agent. However, when a solvent is employed in which this resin is not soluble, such as a pure hydrocarbon. the cellulose acetate butyrate is incompatible with the mixture of isocyanate-terminated reaction product and solvent, the butyrate separates out and a cloudy resin solution forms.

It is a primary object of this invention to overcome the disadvantages inherent in previously known additives for urethane resin solutions.

It is another object of this invention to provide a leveling agent additive for urethane resin solutions which results in clear, homogeneous solutions with required leveling properties when applied to various substrates.

Another object of this invention is to provide an improved additive for reducing the viscosity of urethane resin solutions.

It is another object of this invention to provide improved urethane coatings prepared from isocyanate-terminated reaction products dissolved in a hydrocarbon solvent therefor.

These and other objects of the invention will be apparent from the following detailed description thereof.

It has now been discovered that the foregoing objects are accomplished when an effective proportion of a polyether, as defined more fully below, is added to a urethane resin solution. When such an ether is added, the viscosity of the resulting composition is markedly reduced, and when the composition is cured to yield a urethane coating, the resulting coating is clear, rigid, level and substantially free of indentations.

More in detail, any polyether selected from the group consisting of glycol diethers and ether formals capable of reducing the viscosity of urethane resin solutions and yielding a smooth urethane coating substantially free of indentations may be added in a small but effective proportion to the urethane resin solution.

Typical examples of suitable glycol diethers include:

polyoxy-1,2-propylene diethyl diether,
diethylene glycol dibutyl ether,
diethyl ether of polyoxypropylene ether glycol,
diethyl ether of polyoxybutylene ether glycol, mixtures thereof, and the like.

Suitable ether formals are represented by the formula:

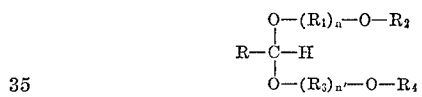

where R is selected from the group consisting of hydrogen and alkyl containing between 1 and 4 carbon atoms,
where $R_1$ and $R_3$ are each an alkyl selected from the group consisting of $C_2H_4$—, $C_3H_6$—, $C_4H_8$— and mixtures thereof,
where $n$ and $n'$ are each a number in the range between about 1 and about 8,
and where $R_2$ and $R_4$ are each an alkyl having between 1 and about 12 carbon atoms.

Typical examples of suitable ether formals of this type are as follows:

ethylene glycol monobutyl ether formal,
dietylene glycol monobutyl ether formal,
ethylene glycol monopropyl ether formal,
diethylene glycol monopropyl ether formal,
ethylene glycol monoethyl ether formal,
diethylene glycol monoethyl ether formal,
formal prepared by reacting formaldehyde with mixed ethylene glycol-propylene glycol monoethyl ethers,
ethylene glycol monomethyl ether formal,
diethylene glycol monomethyl ether formal,
formal prepared by reacting formaldehyde with mixed ethylene glycol-propylene glycol monomethyl ethers,
propylene glycol monomethyl ether formal,
dipropylene glycol monomethyl ether formal,
propylene glycol monoethyl ether formal,
dipropylene glycol monoethyl ether formal,
propylene glycol monopropyl ether formal,
dipropylene glycol monopropyl ether formal,
formal prepared by reacting formaldehpde with mixed propylene glycol-ethylene glycol monopropyl ethers,
propylene glycol monobutyl ether formal,
dipropylene glycol monobutyl ether formal,
formal prepared by reacting formaldehyde with mixed proplene glycol-ethylene glycol monobutyl ethers, formal prepared by reacting formaldehyde with mixed oxypropylated hexanol-oxypropylated heptanol,
oxybutylated isodecanol ether formal such as a formal prepared by reacting formaldehyde with a 6:1 adduct of oxybutylated isodecanol,
diethyl ether of polyoxyalkylene ether glycols,
mixed formals prepared by reacting formaldehyde with a oxypropylated mixture of amyl and hexyl alcohols,
formal prepared from a mixture of monoethyl ethers of propylene glycol and dipropylene glycol,
mixtures thereof and the like.

Sufficient polyether of this invention is generally added to the urethane resin solution to provide between about 0.1 and about 3.0 and preferably between about 0.3 and about 1.5 percent by weight of the isocyanate-terminated polyether polyol present in the composition, but greater or lesser proportions may be employed if desired. The order of mixing the polyether is not critical. It may be added with the polyether polyol or the organic isocyanate when forming the isocyanate-terminated reaction product or it may be added along with the solvent or other additives while preparing the urethane resin solution.

The composition of urethane resin solutions in which the polyethers of this invention are effective are well known in the art. As indicated above, these solutions are formed by reacting a polyether polyol with an organic isocyanate. The polyether polyol component is generally formed by reacting an alkylene oxide such as propylene oxide and butylene oxide with a polyhydroxy compound such as glycerin, ethylene glycol, propylene glycol, pentaerythritol, butylene glycol - 2,3, butylene glycol - 1,3, catechol, resorcinol, and the like. The oxyalkylated polyol generally has a molecular weight in the range between about 300 and about 2000, and preferably between about 400 and about 1500.

The organic isocyanate component of the urethane resin solution is preferably a mixture of isomers of 2,4 - toluene diisocyanate and 2,6 - toluene diisocyanate in a weight ratio of 80:20, but other suitable organic polyisocyanates include m- and p-phenylene diisocyanate, p,p'-diphenyl isocyanate and phenylene polyisocyanates, mixtures thereof and the like. The proportion of organic polyisocyanates reacted with the polyether polyol is generally sufficient to provide between about 1.5 and about 2 moles of NCO groups in the organic polyisocyanates per mole of OH groups in the polyether polyol. However, larger proportions polyisocyanate may be employed if desired.

The reaction of polyether polyol and organic polyisocyanate is either carried out in the presence of a suitable solvent or the isocyanate-terminated reaction product is dissolved in a suitable solvent to yield the urethane resin solution. Any suitable solvents may be employed, but the solvent is generally a hydrocarbon solvent having a kauri-butanol value in the range between about 85 and about 110. Typical examples of suitable hydrocarbon solvents include hexane, heptane, benzene, toluene, o-xylene, m-xylene, p-xylene, naphthalene, mixtures thereof, and the like. The weight ratio of isocyanate-terminated reaction product to solvent in the urethane resin solution is generally in the range between about 0.5:1 and 1.5:1, but the ratio may be higher or lower if desired.

Polyethers of this invention may also be used to replace part or all of the cellulose acetate butyrate leveling agent in urethane resin solutions which employ solvents other than hydrocarbon solvents. The polyethers of this invention are also compatible with other materials such as fillers, pigments and the like, which may be added to certain urethane resin solutions prior to curing.

The following examples are presented to define the invention more fully without any intention of being limited thereby. All parts and percentages are by weight unless otherwise specified.

EXAMPLE 1

A solution was prepared by admixing the following components in the following proportions:

| Component: | Proportion, grams |
| --- | --- |
| Oxypropylated glycerin (molecular weight=453) | 1190 |
| 2,6 - di(tertiarybutyl)4 - methylphenol | 11.1 |
| n - Butyl acetate | 1190 |
| Toluene | 1032 |
| Ethylene glycol monobutyl ether formal | 22 |

This solution was heated to effect the azeotropic distillation of n-butyl acetate and water until the solution was substantially dry and until about 108 grams of n-butyl acetate was removed from the solution.

Toluene diisocyanate, as a mixture of isomers of 2,4- and 2,6-toluene diisocyanate in a weight ratio of 80:20, was added to the solution in a proportion of 1032 grams while the solution was at a temperature of 30° C. The mixture was heated to a temperature of about 80° C. for about 3.5 hours to effect reaction of the isocyanate and oxypropylated glycerin to yield a solution of an isocyanate-terminated reaction product. The resulting urethane resin solution was applied to both wood and glass surfaces and allowed to stand overnight. The resulting hard, non-tacky surface was smooth and substantially free of indentations.

For purposes of comparison, the same formulation was prepared with the exception that no ethylene glycol monobutyl ether formal was admixed in the composition. The resulting urethane coating was not smooth, and the surface contained a great many indentations ("craters").

Example 2

A urethane resin solution was prepared in a manner similar to the process of Example 1 using the following components in the following proportions:

| Component: | Proportion, grams |
| --- | --- |
| Oxypropylated glycerin (molecular weight=600) | 1230 |
| 2,6-di(tertiarybutyl)4-methylphenol | 11.1 |
| Mixture of xylenes and alkyl-substituted aromatics containing 8–9 carbon atoms | 2101 |
| Toluene diisocyanate | 836 |
| Ethylene glycol monobutyl ether formal | 22.2 |

The resulting urethane resin solution was applied to a smooth surface and dried for 16 hours. The coating solution, prior to drying, had a relatively low viscosity and was easy to handle and apply. The cured coating was a substantially clear surface, free of indentations.

For purposes of comparison, the procedure was repeated with the exception that the ethylene glycol monobutyl ether formal was replaced with 22.2 grams of cellulose acetate butyrate. The resulting fluid was applied to a glass surface and dried for 16 hours. The coating solution was extremely viscous and the resulting coating had poor leveling properties.

Example 3

A urethane resin solution was prepared in a manner similar to the process of Example 1 using the following components in the following proportions:

| Component: | Proportion, grams |
| --- | --- |
| Oxypropylated glycerin (molecular weight=600) | 2000 |
| 2,6-di(tertiarybutyl)4-methylphenol | 20 |
| Ethylene glycol monoethyl ether acetate | 425.5 |
| Xylene | 425.5 |
| Ethylene glycol monobutyl ether formal | 40 |

The resulting liquid had a viscosity of 54,000 c.p.s. and was easy to apply to the substrate.

For purposes of comparison the ethylene glycol monobutyl ether formal in the above formulation was replaced with 400 grams of cellulose acetate butyrate. The resulting liquid had a viscosity of 105,000 c.p.s., which was nearly twice that obtained with an equivalent weight of the formal. The coating composition containing cellulose acetate butyrate was extremely difficult to apply.

Examples 4–8

A urethane resin solution was prepared as in Example 1, and five portions of 100 grams each were separated. Each portion was admixed with 25 grams of a mixture of equal weight of toluene and n-butyl acetate and 0.5 gram of the polyether recited below. Each portion was identified as Example 4, 5, 6, 7, and 8 respectively.

Each portion remained a clear solution after being allowed to stand overnight, and no precipitation occurred during that period. Each mixture was then applied to a glass plate with a Bird applicator to form a film about 0.003 inch thick. The film was permitted to dry and then observed for smoothness and absence of ripples or indentations. In each instance, the resulting film was smooth, rigid and free from ripples and indentations.

The ethers tested in accordance with this procedure were as follows:

Example:
4 _____ Polyoxy 1,2-propylene diethyl ether.
5 _____ Diethylene glycol dibutylether.
6 _____ Mixed formals made from formaldehyde and an oxypropylated mixture mixture of amyl and hexyl alcohols.
7 _____ Formal prepared from formaldehyde and a 6:1 adduct of oxybutylated isodecanol.
8 _____ Formal of a mixture of monoethers of propylene glycol and dipropylene glycol.

Various modifications of the invention, some of which have been referred to above, may be employed without departing from the spirit of the invention. What is desired to be secured by Letters Patent is:

1. A urethane resin solution of an isocyanate-terminated polyether polyol dissolved in a hydrocarbon solvent capable of being cured to a rigid urethane coating, said urethane resin solution containing a small but effective viscosity reducing proportion of a polyether selected from the group consisting of glycol diethers and ether formals having the formula

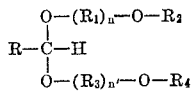

where R is selected from the group consisting of hydrogen and alkyl containing between 1 and 4, carbon atoms where $R_1$ and $R_3$ are each an alkyl selected from the group consisting of $C_2H_4$—, $C_3H_6$—, $C_4H_8$— and mixtures thereof, where $n$ and $n'$ are each a number in the range between about 1 and about 8, and $R_2$ and $R_4$ are each an alkyl having between 1 and about 12 carbon atoms.

2. A urethane resin solution of an isocyanate-terminated polyether polyol dissolved in a hydrocarbon solvent capable of being cured to a rigid urethane coating, said urethane resin solution containing a polyether selected from the group consisting of glycol diethers and ether formals having the formula

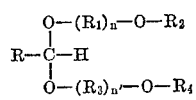

where R is selected from the group consisting of hydrogen and alkyl containing between 1 and 4 carbon atoms, where $R_1$ and $R_3$ are each an alkyl selected from the group consisting of $C_2H_4$—, $C_3H_6$—, $C_4H_8$— and mixtures thereof, where $n$ and $n'$ are each a number in the range between about 1 and about 8, and $R_2$ and $R_4$ are each an alkyl having between 1 and about 12 carbon atoms, the proportions of said polyether being in the range between about 0.1 and about 3.0 percent by weight of said isocyanate-terminated polyether polyol in said urethane resin solution.

3. The composition of claim 2 wherein said polyether is an ether formal having the formula recited in claim 1.

4. The composition of claim 3 wherein said ether formal is ethylene glycol monobutyl ether formal.

5. The composition of claim 3 wherein said ether formal is a mixture of formals made from formaldehyde and an oxypropylated mixture of amyl and hexly alcohols.

6. The composition of claim 3 wherein said ether formal is a formal of a mixture of monoethyl ethers of propylene glycol and dipropylene glycol.

7. The composition of claim 2 wherein said polyether is a glycol diether.

8. The composition of claim 7 wherein said glycol diether is polyoxy 1,2-proplyene diethyl ether.

9. The composition of claim 7 wherein said glycol diether is diethylene glycol dibutyl ether.

10. The composition of claim 2 wherein said isocyanate-terminated polyether polyol is the reaction product of toluene diisocyanate and oxypropylated glycerin.

11. A urethane coating-forming composition comprised of (1) the reaction product of toluene diisocyanate and oxypropylated glycerin having a molecular weight in the range between about 200 and about 3000, and the molar ratio of NCO groups in the toluene diiocyanate to hydroxyl groups in said oxypropylated glycerin being in the range between about 1.5 and about 2.0, (2) a solvent comprised of a mixture of toluene and n-butyl acetate, the weight ratio of 1 to 2 being in the range between about 0.5:1 to about 1.5:1, and (3) a small but effective viscosity reducing amount of ethylene glycol monobutyl ether formal.

12. A urethane coating-forming composition comprised of (1) the reaction product of toluene diisocyanate and oxypropylated glycerin having a molecular weight in the range between about 200 and about 3000, and the molar ratio of NCO groups in the toluene diisocyanate to hydroxyl groups in said oxypropylated glycerin being in the range between about 1.5 and about 2.0, (2) a solvent comprised of a mixture of toluene and n-butyl acetate, the weight ratio of 1 to 2 being in the range between about 0.5:1 and about 1.5:1, and (3) ethylene glycol monobutyl ether formal in a proportion in the range between about 0.1 and about 3.0 per cent by weight of said reaction product in said urethane resin solution.

13. The urethane coating formed by curing the composition of claim 1.

14. The urethane coating formed by curing the composition of claim 2.

15. The urethane coating formed by curing the composition of claim 12.

References Cited

UNITED STATES PATENTS

| | | | |
|---|---|---|---|
| 2,161,025 | 6/1939 | Doolittle | 260—33.2 |
| 2,786,081 | 3/1957 | Kress | 260—33.2 |
| 3,115,479 | 12/1963 | Windemuth | 260—33.6 |
| 3,218,348 | 11/1965 | McElroy | 260—33.6 |
| 3,140,273 | 7/1964 | Nischk | 260—33.6 |

JULIUS FROME, *Primary Examiner.*